(12) United States Patent
Mahowald (10) Patent No.: US 7,733,375 B2
(45) Date of Patent: Jun. 8, 2010

(54) SETTING IMAGER PARAMETERS BASED ON CONFIGURATION PATTERNS

(75) Inventor: Peter H. Mahowald, Los Altos, CA (US)

(73) Assignee: Marvell International Technology Ltd. (BM)

(*) Notice: Subject to any disclaimer, the term of this patent is extended or adjusted under 35 U.S.C. 154(b) by 1292 days.

(21) Appl. No.: 11/087,453

(22) Filed: Mar. 23, 2005

(65) Prior Publication Data

US 2006/0215033 A1 Sep. 28, 2006

(51) Int. Cl.
*H04N 5/225* (2006.01)
*H04N 5/232* (2006.01)

(52) U.S. Cl. ............................. 348/207.99; 348/211.1; 348/211.2; 348/211.4; 348/211.5

(58) Field of Classification Search ............... 348/14.01, 348/14.02, 14.03, 14.04, 14.08, 14.09, 14.1, 348/14.11, 14.12, 14.13, 14.14, 14.16, 14, 348/152, 153, 154, 155, 156, 161, 211.99, 348/211.1, 211.2, 211.3, 211.4, 211.5, 211.6, 348/211.8, 211.11, 211.12, 211.13, 333.01, 348/333.02, 333.03, 207.99, 187, 188, 189, 348/192, 175; 345/175
See application file for complete search history.

(56) References Cited

U.S. PATENT DOCUMENTS

| | | | |
|---|---|---|---|
| 4,825,058 A | 4/1989 | Poland | |
| 5,737,491 A | 4/1998 | Allen et al. | |
| 6,330,975 B1 | 12/2001 | Bunte et al. | |
| 6,628,326 B1 | 9/2003 | Manico et al. | |
| 6,768,509 B1 * | 7/2004 | Bradski et al. | 348/207.99 |
| 6,915,072 B2 * | 7/2005 | Takahashi et al. | 396/296 |
| 7,427,983 B1 * | 9/2008 | Hildebrandt et al. | 345/175 |
| 7,479,982 B2 * | 1/2009 | Otani et al. | 348/188 |
| 2003/0137588 A1 | 7/2003 | Wang et al. | |
| 2003/0154262 A1 | 8/2003 | Kaiser et al. | |
| 2004/0095477 A1 | 5/2004 | Maki et al. | |
| 2005/0052532 A1 * | 3/2005 | Elooz et al. | 348/148 |

* cited by examiner

*Primary Examiner*—David L Ometz
*Assistant Examiner*—Peter Chon (57) ABSTRACT

An imager comprises an image sensor and a controller coupled to the image sensor. The image sensor is configured to obtain an image of a field of view of the image sensor with a configuration pattern placed in the field of view. The controller is configured to determine a location of the configuration pattern within the image, interpret the configuration pattern, and set a parameter of the imager based on the interpretation of the configuration pattern.

18 Claims, 6 Drawing Sheets

SETTING IMAGER PARAMETERS BASED ON CONFIGURATION PATTERNS

BACKGROUND

In many image sensor applications, there is an initial calibration or setup mode where backgrounds, Regions Of Interest (ROI), network configuration parameters, or other parameters are established. For example, in an application where an imager is used in a security application to ensure no personnel or objects are placed in a keep out region, the imager is typically configured to ascertain where the keep out region is located. In situations where backgrounds are subtracted from an image to improve the sensitivity of the imager, the imager typically determines when to obtain the background image so that no foreign objects are present in the background image. In another example, network nodes in a simple (not ad hoc) network are assigned identities and the routing information for communicating with a base station or command center are provided to each node.

Typically, initiating the obtainment of background images, establishing regions of interest, setting network configuration parameters, or setting other parameters of imagers is performed through a command center or base station using a computer and a graphical user interface. Using a computer and a graphical user interface, however, has several disadvantages. First, using a computer and a graphical user interface requires significant software development to design the interface. Second, using a computer and a graphical user interface requires that the network of imagers already be established. Third, using a computer and a graphical user interface requires substantial image transmission over a network that is typically designed for a lower data capacity.

In addition, in an example situation where a background image needs to be obtained, a trigger via the command center is issued. The command center may be remote from the imager where the background is being obtained, therefore making it difficult to determine if the field of view of the imager is clear. Initiating a background image read is more conveniently performed locally at the imaging node.

In certain situations where a region of interest needs to be established, due to the two dimensional image obtained by an imager, it is difficult to precisely define the region of interest in the three dimensional field of view of the imager. Using a graphical user interface to define a region of interest using the two dimensional image is a complex and difficult process.

In an example situation where a network needs to be configured, a relatively complicated ad hoc network with self routing would require increased network bandwidth and additional traffic to maintain the network. Therefore, it is more advantageous to hard code a simple network giving each node a network identity and a routing path to the base station. Typically, this data is provided by the command center or base station.

In situations where the command center or base station is not yet available, or where a command center or base station is not used, it would be advantageous to locally set the parameters of imagers at the imager itself. The imagers, however, are typically small and have no user interface for directly accessing the memory of the imager to set or update the parameters.

For these and other reasons, there is a need for the present invention.

SUMMARY

One aspect of the present invention provides an imager. The imager comprises an image sensor and a controller coupled to the image sensor. The image sensor is configured to obtain an image of a field of view of the image sensor with a configuration pattern placed in the field of view. The controller is configured to determine a location of the configuration pattern within the image, interpret the configuration pattern, and set a parameter of the imager based on the interpretation of the configuration pattern.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
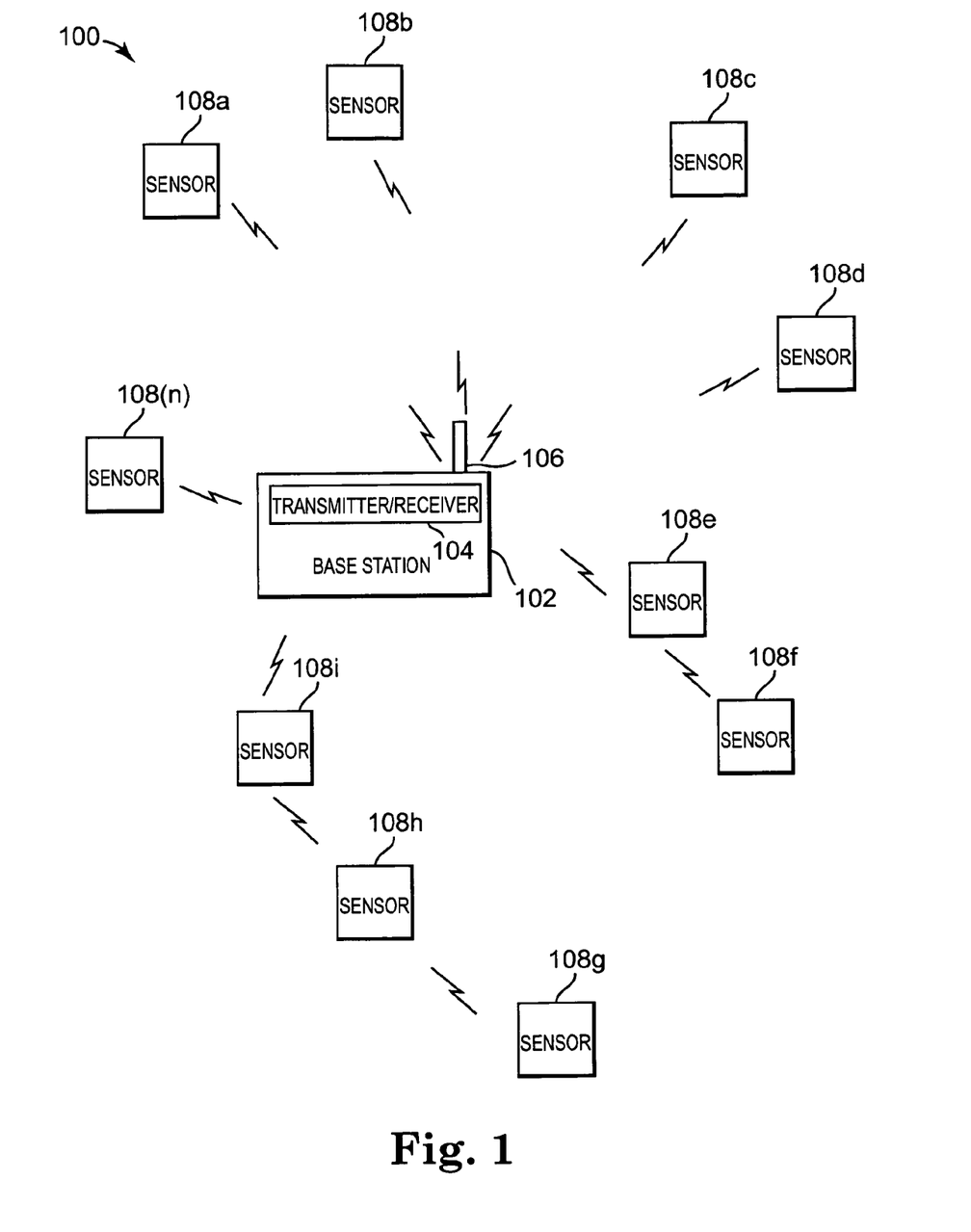
FIG. 1 is a block diagram illustrating one embodiment of a wireless sensor network.

FIG. 1 is a block diagram illustrating one embodiment of a wireless sensor network 100. Wireless sensor network 100 includes a command center or base station 102 and a plurality of wireless sensors 108a-108(n), where n equals the number of wireless sensors. Wireless sensors 108a-108(n) are herein collectively referred to as sensors 108. Base station 102 includes a transmitter/receiver 104 and an antenna 106. Each wireless sensor 108 includes a transmitter and/or receiver. Base station 102 communicates with sensors 108 through transmitter/receiver 104 and antenna 106. The data transferred between base station 102 and sensors 108 can include image data, alarms, status flags, climate control data, environmental data, audio data, or any other suitable data obtainable by a wireless sensor.

Sensors 108 are located at varying distances from base station 102. In one embodiment, sensors 108 communicate directly with transmitter/receiver 104 of base station 102 or indirectly with transmitter/receiver 104 through another transmitter and receiver of another sensor 108. For example, in one embodiment, sensor 108g communicates with base station 102 by routing data through sensor 108h. Sensor 108h routes the data to sensor 108i, which communicates directly with base station 102. By setting the routing and the network identity for each sensor 108, a sensor 108 can be located at a distance from base station 102 that is farther than the transmission range of the sensor. Each sensor 108 need only be within transmission range of one other sensor 108, with at least one sensor 108 in the chain being within the transmission range of base station 102.

In one embodiment, base station 102 is used to configure the parameters of sensors 108 through the wireless network. In another embodiment, the parameters of sensors 108 are configured without communicating through the wireless network with base station 102. In this embodiment, sensors 108 are configured locally. In one embodiment, where a sensor 108 is an imager, the imager is configured by placing configuration patterns in the field of view of the imager. In one embodiment, configuration patterns are as simple as a pattern printed on a sheet of paper or as complex as an image displayed on a laptop computer screen.

Sensor 108 obtains an image including the configuration pattern. Sensor 108 then locates the configuration pattern in the image and interprets the configuration pattern to set a parameter of sensor 108. Using this process, sensor 108 can be configured without base station 102 and without a network. In addition, sensor 108 can be configured using low cost materials, (i.e., patterns printed on paper) and/or readily available equipment (i.e., laptop computer) without having to electrically couple directly to a user interface on sensor 108.

Figure 2:
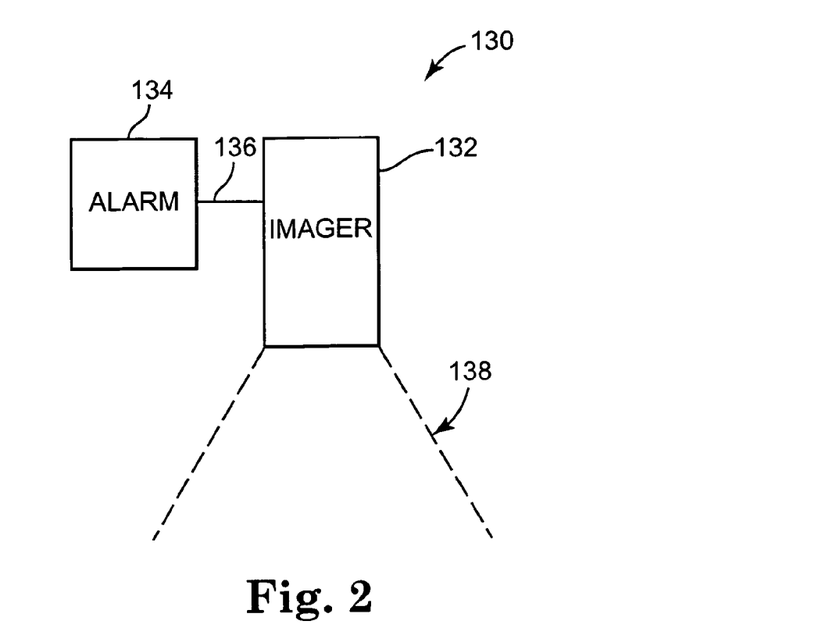
FIG. 2 is a block diagram illustrating one embodiment of an imager node coupled to an alarm.

FIG. 2 is a block diagram illustrating one embodiment of an imager node 130. Imager node 130 includes imager 132 and alarm 134. Imager 132 is electrically coupled to alarm 134 through signal path 136. Imager 132 has a field of view indicated at 138. In one embodiment, imager node 130 is one or more sensors 108 in wireless sensor network 100. In another embodiment, imager node 130 is an isolated self contained system. Imager 132 is used to obtain images of field of view 138. The images, in one embodiment, are processed by imager 132 based on parameters stored in imager 132 to provide data or an alarm if a certain situation exists. For example, in one embodiment, imager 132 is configured to sound alarm 134 if an object is placed within a specified region of interest in field of view 138. If an object is placed in the region of interest of imager 132, imager 132 provides a signal to alarm 134 to activate alarm 134. In one embodiment, alarm 134 is a light, a siren, a transducer, or other suitable alarm.

Imager 132 is configured locally by placing a configuration pattern in field of view 138 of imager 132. Imager 132 obtains an image including the configuration pattern. Imager 132 then locates the configuration pattern in the image and interprets the configuration pattern to set a parameter of imager 132. The parameter setting is stored in a memory of imager 132 for operating imager 132. By configuring imager 132 using configuration patterns, imager 132 can be more compact in comparison to an imager that uses a local user interface that electrically couples directly to a programming device for setting the parameters of the imager. In addition, embodiments of imager 132 uses less power due to the lack of a local user interface that would require additional circuitry and therefore consume more power.

Figure 3:
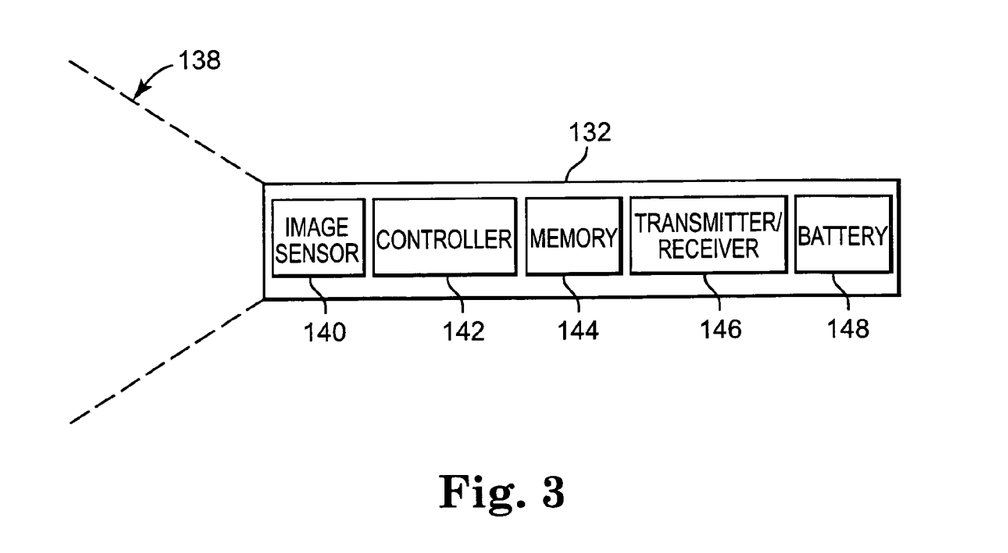
FIG. 3 is a block diagram illustrating one embodiment of an imager.

FIG. 3 is a block diagram illustrating one embodiment of imager 132. Imager 132 includes an image sensor 140, a controller 142, a memory 144, a transmitter/receiver 146, and a battery 148 for providing power to operate imager 132. Image sensor 140 obtains images of field of view 138 of imager 132. In one embodiment, image sensor 140 comprises a Charge-Coupled Device (CCD). In another embodiment, image sensor 140 comprises a Complementary Metal-Oxide-Semiconductor (CMOS) device. In other embodiments, other suitable image sensors can be used. Image sensor 140 obtains images in color or black and white. Image sensor 140 is sensitive to light in the visible spectrum, and/or the invisible spectrum. Image sensor 140 passes image data to controller 142.

In one embodiment, memory 144 comprises Random Access Memory (RAM) and Read Only Memory (ROM). The ROM stores instructions executed by controller 142 for operating imager 132. The RAM stores image data obtained by image sensor 140 and configuration parameters for operating imager 132.

Controller 142 controls the functioning of imager 132. In one embodiment, controller 132 comprises a processor, application specific integrated circuit (ASIC), or other suitable type of controller. Controller 142 analyzes the image data obtained by image sensor 140 based on configuration parameters or other data stored in memory 144 to provide an output to transmitter/receiver 146 or alarm 134 (FIG. 2), or to modify a configuration parameter of imager 132.

Transmitter/receiver 146 communicates with base station 102 (FIG. 1) to transmit data to base station 102 or receive commands and data from base station 102. In one embodiment, transmitter/receiver 146 communicates with base station 102 by routing data through another sensor 108. In applications where imager 132 is used in an isolated stand alone system, transmitter/receiver 146 can be omitted from imager 132 to reduce the size of imager 132 and reduce the power consumption of imager 132.

Figure 4:
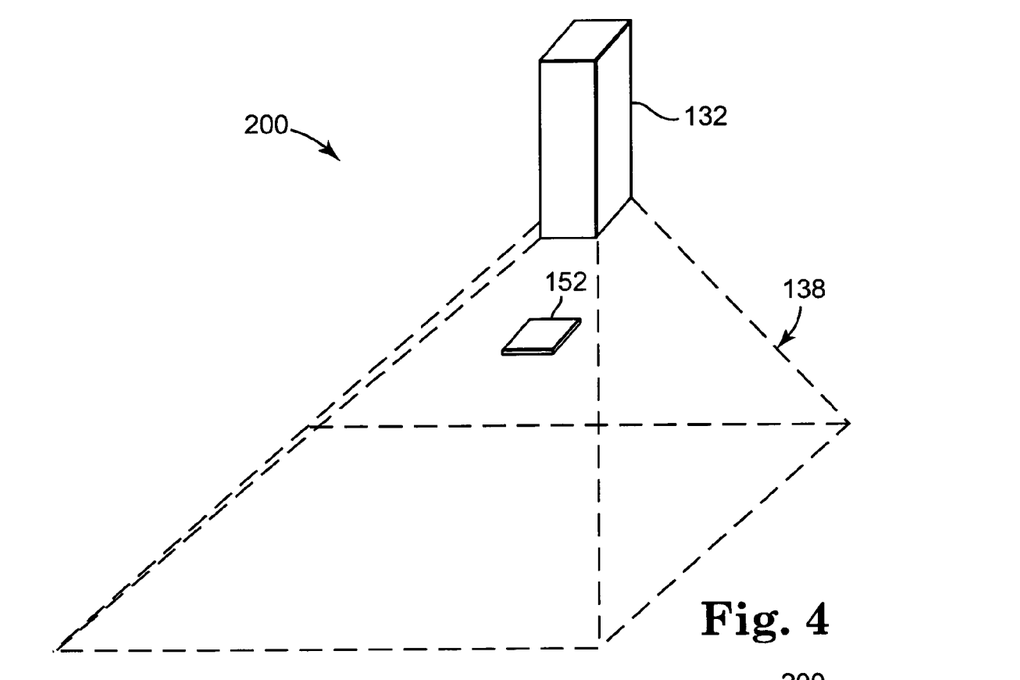
FIG. 4 is a diagram illustrating one embodiment of setting a parameter of an imager using a configuration pattern.

FIG. 4 is a diagram illustrating one embodiment of setting parameters of imager 132 based on a configuration pattern 152. A user places a configuration pattern 152 in field of view 138 of imager 132. Image sensor 140 (FIG. 3) obtains an image of field of view 138 including configuration pattern 152. Image sensor 140 passes the image data to controller 142, which determines the location and/or identity of configuration pattern 152 in the image based on a comparison to data stored in memory 144.

For example, in one embodiment, a previously obtained image of a configuration pattern 152 can be stored in memory 144 for comparing to the currently obtained image of a configuration pattern 152. In another embodiment, distinguishing characteristics of a configuration pattern 152 can be stored in memory 144 for comparing to the currently obtained image of a configuration pattern 152. In one form of the invention, correlation, an algorithmic technique known in the art, is used to locate and identify a configuration pattern 152 in the obtained image. In one embodiment, controller 142 records the location of configuration pattern 152 by the x and y pixel coordinates of configuration pattern 152 in the image. Based on the location and identity of configuration pattern 152, imager 132 sets or updates the selected parameter stored in memory 144.

Configuration pattern 152 comprises any suitable pattern capable of conveying information or commands to imager 132. In one embodiment, configuration pattern 152 comprises concentric circles, a checkerboard, shapes, or any other suitable pattern capable of providing information. Different configuration patterns are used to set different parameters of imager 132. The configuration patterns are provided in any suitable form, such as printed on individual sheets of paper, printed on pages of an installation manual, or provided in an electronic format for displaying on a laptop computer screen or other electronic display device. In one embodiment, a configuration program that flashes a series of configuration patterns on an electronic display device based on inputs to the configuration program is used to set the parameters of imager 132.

In one embodiment, configuration pattern 152 comprises a concentric circle pattern of a certain color to indicate to imager 132 that the user is setting the region of interest. The user moves configuration pattern 152 within field of view 138 to define the desired region of interest. In one embodiment, configuration pattern 152 includes numbers on a checkerboard background to indicate the network identity and network routing parameters for imager 132. In another embodiment, configuration pattern 152 includes a unique shape to indicate to imager 132 to prepare to obtain a background image of field of view 138. Once the user removes configuration pattern 152 from field of view 138, imager 132 obtains the background image.

Figure 5:
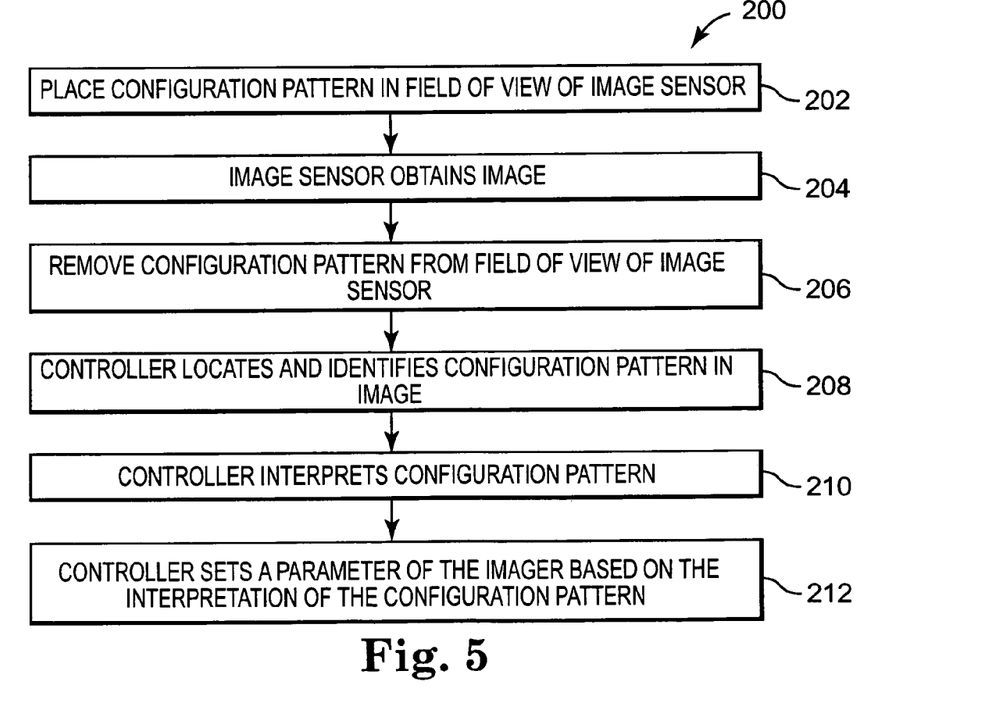
FIG. 5 is a flow diagram illustrating one embodiment of a method for setting parameters of an imager based on a configuration pattern.

FIG. 5 is a flow diagram illustrating one embodiment of a method 200 for setting a parameter of an imager 132. At 202, a user places a configuration pattern 152 in field of view 138 of imager 132. At 204, imager 132 obtains an image of field of view 138 including configuration pattern 152. At 206, the user removes configuration pattern 152 from field of view 138 of imager 132. At 208, controller 142 locates and identifies configuration pattern 152 in the obtained image. At 210, controller 142 interprets configuration pattern 152 based on data stored in memory 144 to determine what parameter to set and the value to which to set the parameter. At 212, controller 142 sets the parameter of the imager 132 based on the interpretation of the configuration pattern 152.

Figure 6:
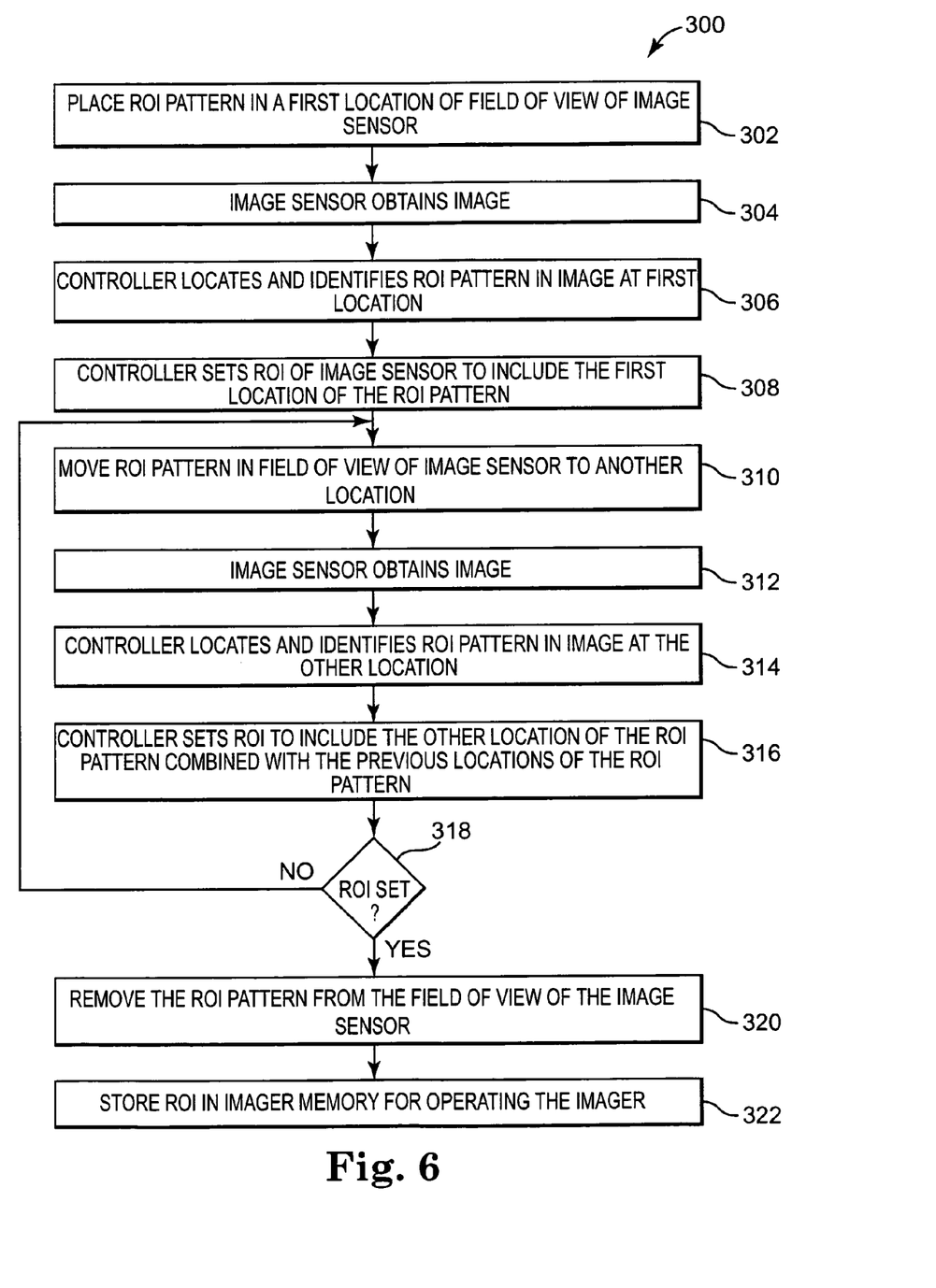
FIG. 6 is a flow diagram illustrating one embodiment of a method for setting a region of interest of an imager.

FIG. 6 is a flow diagram illustrating one embodiment of a method 300 for setting the region of interest for imager 132. At 302, a user places a region of interest (ROI) configuration pattern 152 in a first location in field of view 138 of imager 132. At 304, imager 132 obtains an image including ROI configuration pattern 152. At 306, controller 142 locates and identifies ROI configuration pattern 152 in the obtained image at the first location. At 308, controller 142 sets the ROI of imager 132 to include the first location of ROI configuration pattern 152.

At 310, the user moves ROI configuration pattern 152 in field of view 138 of imager 132 to a second location. At 312, imager 132 again obtains an image including moved ROI configuration pattern 152. At 314, controller 142 locates and identifies ROI configuration pattern 152 in the obtained image at the second location. At 316, controller 142 sets the ROI of imager 132 to include the first location of ROI configuration pattern 152 combined With the second location of ROI configuration pattern 152.

At 318, the user determines whether they have completed setting the desired ROI for imager 132. If the user has not completed setting the desired ROI for imager 132, then the user returns to block 310, where the user moves ROI configuration pattern 152 to another location in field of view 138 of imager 132 and the process repeats. If the user has completed setting the desired ROI for imager 132, then at 320, the user removes ROI configuration pattern 152 from field of view 138 of imager 132. At 322, controller 142 stores the specified ROI of imager 132 in memory 144 for operating imager 132.

Figure 7:
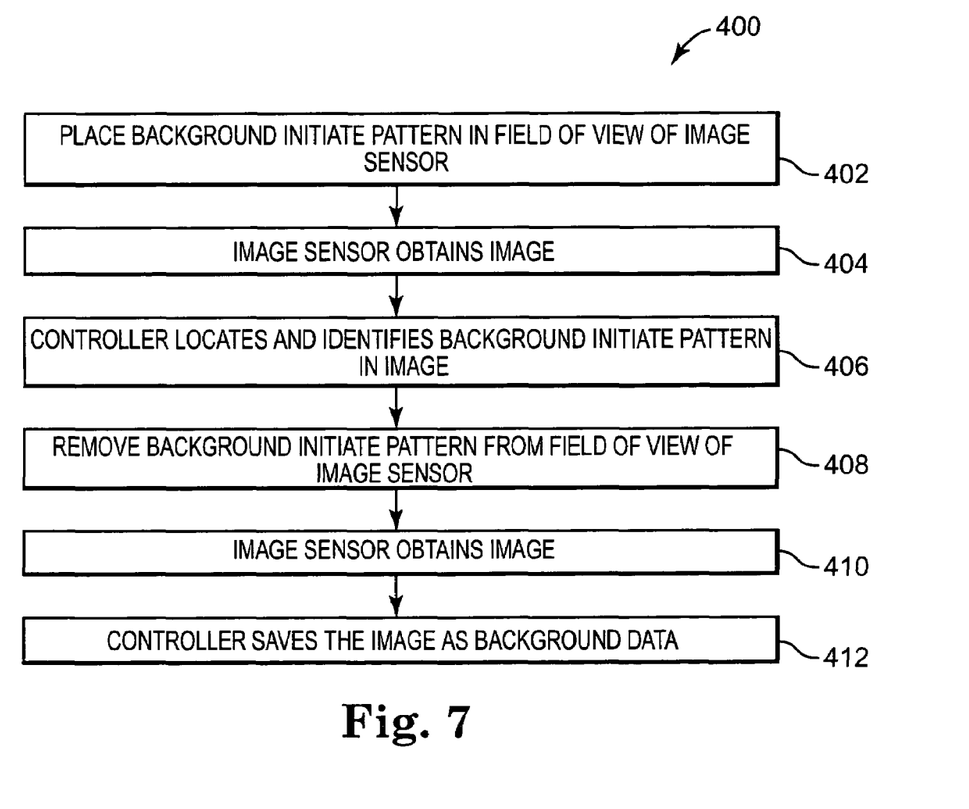
FIG. 7 is a flow diagram illustrating one embodiment of a method for obtaining a background image for an imager.

FIG. 7 is a flow diagram illustrating one embodiment of a method 400 for obtaining a background image for imager 132. At 402, a user places a background initiate configuration pattern 152 in field of view 138 of imager 132. At 404, imager 132 obtains an image including background initiate configuration pattern 152. At 406, controller 142 locates and identifies background initiate configuration pattern 152 in the obtained image based on data stored in memory 144. At 408, once the user is sure field of view 138 is free of foreign objects, the user removes background initiate configuration pattern 52 from field of view 138 of imager 132. At 410, imager 132 obtains an image of field of view 138 with no foreign objects present to obtain a background image. At 412, controller 142 saves the background image as background data in memory 144. For future images, imager 132 subtracts the background data from the images to improve the sensitivity of imager 132.

Figure 8:
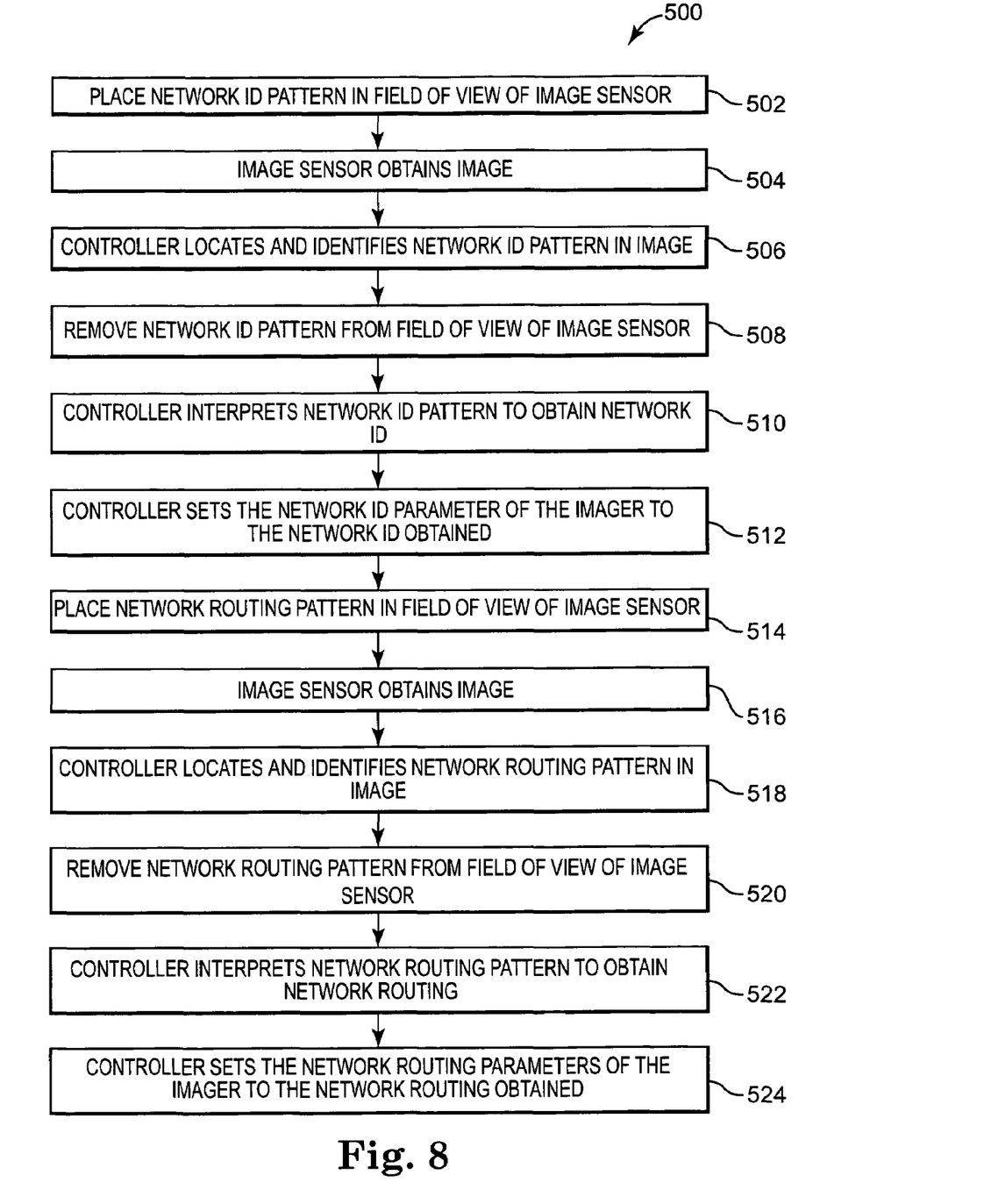
FIG. 8 is a flow diagram illustrating one embodiment of a method for setting network parameters of an imager node.

FIG. 8 is a flow diagram illustrating one embodiment of a method 500 for setting the network configuration parameters of imager 132. At 502, a user places a network ID configuration pattern 152 in field of view 138 of imager 132. At 504, imager 132 obtains an image including network ID configuration pattern 152. At 506, controller 142 locates and identifies network ID configuration pattern 152 in the obtained image. At 508, the user removes network ID configuration pattern 152 from field of view 138 of imager 132. At 510, controller 142 interprets network ID configuration pattern 152 to obtain a network ID. At 512, controller 142 sets the network ID parameter of imager 132 based on the network ID obtained from the image interpretation.

At 514, the user places a network routing configuration pattern 152 in field of view 138 of imager 132. At 516, imager 132 obtains an image including network routing configuration pattern 152. At 518, controller 142 locates and identifies network routing configuration pattern 152 in the obtained image. At 520, the user removes network routing configuration pattern 152 from field of view 138 of imager 132. At 522, controller 142 interprets network routing configuration pattern 152 to obtain the network routing information. At 524, controller 142 sets the network routing parameters of imager 132 based on the network routing information obtained from the image interpretation.

Embodiments of the present invention provide a system and method for configuring imagers without the need of a computer or a network to interface with the imagers. The imagers are programmed locally using configuration patterns displayed in the field of view of the imagers. In the case of initiating a background image read, the user can be present to ensure that the background is clear of foreign objects. In the case of network initialization, the initialization can occur before the network is fully installed and without the command center or base station being operational. In the case of defining the ROI, the user can simply move a configuration pattern within the field of view of the imager and not have to use complex software to define the ROI. Likewise, other imager parameters, such as frame rate, transmission rate, internal clock time, etc., can be set in a similar manner using configuration patterns.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An image sensing network comprising a base station and a plurality of image sensing devices, at least two of the plurality of image sensing devices each comprising:
an image sensor configured to obtain an image of a configuration pattern placed within a field of view of the image sensor; and
a controller coupled to the image sensor, the controller configured to determine a location of the configuration pattern within the image, interpret the configuration pattern, and set a network routing parameter of the image sensor based on the interpretation of the configuration pattern, wherein the net-work based parameter comprises a network routing parameter, and wherein the network routing parameter is used by a first of the plurality of image sensing devices to route data from the first of the plurality of image sensing devices to a second of the plurality of image sensing devices for communication to the base station.

2. The image sensing network of claim 1, wherein the controller is configured to set multiple network-based parameters of one of the plurality of image sensing devices based on sequential placement of configuration patterns placed within the field of view of the image sensor.

3. The image sensing network of claim 1, wherein the controller sets a region of interest based on coordinates of a region of interest initiation configuration pattern within the field of view of the image sensor, wherein the coordinates of the region of interest initiation configuration pattern are dynamically changed within the field of view of the image sensor, and wherein the region of interest comprises a region within the field of view that is to be monitored by at least one the plurality of image sensing devices.

4. The image sensing network of claim 1, wherein the controller further sets a background image of the field of view based on an interpretation of a background image initiation configuration pattern that is dynamically moved between multiple locations within the field of view.

5. The image sensing network of claim 1, wherein network-based parameter of the image sensor further comprises a network identity parameter.

6. The image sensing network of claim 1, wherein the configuration pattern comprises one of concentric circles, a checkerboard, and shapes.

7. The image sensing network of claim 1, wherein the data comprises alarm data.

8. A sensor network comprising:
a plurality of wireless image sensing devices; and
a base station communicatively coupled to at least one of the plurality of wireless image sensing devices;
wherein at least two of the plurality of wireless image sensing devices are configured to locally obtain an image in its respective field of view, wherein each of the at least two wireless image sensing devices are responsive to a configuration pattern in its respective field of view to locally set a network routing parameter of respective wireless image sensing device based on an interpretation of the configuration pattern, wherein the network routing parameter is used by a first one of the at least two wireless image sensing devices to route data from the first one of the at least two wireless image sensing devices to a second one of the at least two wireless image sensing devices for communication to the base station.

9. The sensor network of claim 8, wherein the first one of the at least two wireless image sensing devices comprises:
an image sensor;
a controller coupled to the image sensor;
a memory coupled to the controller for storing the network routing parameter of the first one of the at least two wireless image sensing devices; and
a transmitter coupled to the controller for transmitting the data to the second one of the at least two wireless image sensing devices based on the network routing parameter stored in the memory.

10. The sensor network of claim 8, wherein the second one of the at least two wireless imaging devices comprises:
an image sensor;
a controller coupled to the image sensor; and
a receiver coupled to the controller for receiving the data from the first one of the at least two wireless image sensing devices for communication to the base station.

11. The sensor network of claim 8, wherein the configuration pattern comprises an image displayed on an electronic display.

12. The sensor network of claim 8, wherein the configuration pattern comprises an image printed on paper.

13. The sensor network of claim 8, wherein one of the at least two wireless image sensing devices is out of wireless communication range of the base station.

14. A method for configuring a wireless imaging device in a wireless imaging device network, the method comprising:
placing a configuration pattern in a field of view of a first wireless imaging device;
obtaining an image of the field of view of the first wireless imaging device;
locating the configuration pattern in the image obtained by the first wireless imaging device;
locally identifying the configuration pattern at the first wireless imaging device;
interpreting the configuration pattern;
locally setting a network routing parameter of the first wireless imaging device based on the interpretation; and
routing data from the first wireless imaging device to a second wireless imaging device using the network routing parameter of the first wireless imaging device.

15. The method of claim 14, further comprising moving a region of interest initiation configuration pattern between multiple locations within the field of view of the first wireless imaging device, and setting a region of interest for the first wireless imaging device based on an interpretation of the region of interest initiation configuration pattern at the multiple locations.

16. The method of claim 13, further comprising setting a network identity parameter for the first wireless imaging device based on the interpretation of the configuration pattern within the field of view of the first wireless imaging device.

17. The method of claim 14, further comprising automatically initiating a background image read based on placement of a background image read initiation configuration pattern within the field of view of the first wireless imaging device.

18. The method of claim 17, further comprising:
removing the background image read initiation configuration pattern from the field of view of the first wireless imaging device; and
obtaining a background image of the field of view of the first wireless imaging device in response to the removal of the background image read initiation configuration pattern.

* * * * *